(12) United States Patent
Takata (10) Patent No.: US 8,918,058 B2
(45) Date of Patent: Dec. 23, 2014

(54) WIRELESS COMMUNICATION APPARATUS AND WIRELESS COMMUNICATION METHOD

(75) Inventor: Shinichi Takata, Osaka (JP)

(73) Assignee: Icom Incorporated (JP)

( * ) Notice: Subject to any disclaimer, the term of this patent is extended or adjusted under 35 U.S.C. 154(b) by 237 days.

(21) Appl. No.: 13/191,916

(22) Filed: Jul. 27, 2011

(65) Prior Publication Data

US 2012/0149311 A1 Jun. 14, 2012

(30) Foreign Application Priority Data

Dec. 9, 2010 (JP) ................................. 2010-275106

(51) Int. Cl.
- H04B 17/00 (2006.01)
- H04B 7/12 (2006.01)
- H04W 72/02 (2009.01)
- H04W 76/02 (2009.01)

(52) U.S. Cl.
CPC ................. *H04B 7/12* (2013.01); *H04W 72/02* (2013.01); *H04W 76/023* (2013.01)
USPC ...................................................... 455/67.11

(58) Field of Classification Search
CPC ............................ H04W 24/10; H04B 7/0413
USPC ....................................................... 455/67.11
See application file for complete search history.

(56) References Cited

U.S. PATENT DOCUMENTS

| 2009/0176453 A1* | 7/2009 | Wilhelmsson et al. ...... 455/41.2 |
| 2010/0118761 A1* | 5/2010 | Wu et al. ........................ 370/315 |
| 2010/0214928 A1* | 8/2010 | Nogami et al. ............... 370/241 |

FOREIGN PATENT DOCUMENTS

| JP | 04-313926 | 11/1992 |
| JP | 2001086565 | 3/2001 |
| WO | WO 2010098409 A1 * | 9/2010 |

OTHER PUBLICATIONS

Notices of reasons for rejections from Japan Patent Office in Japanese application No. 2010-275106 date Nov. 26, 2013.

* cited by examiner

*Primary Examiner* — Ankur Jain
(74) *Attorney, Agent, or Firm* — Baker & McKenzie LLP (57) ABSTRACT

A wireless communication apparatus is provided for selecting an optimum frequency even when radio wave conditions have changed. A wireless communication apparatus provided with a frequency selector for selecting an optimum frequency for establishing a link for mutually transmitting and receiving has a transceiver for transmitting radio waves to another wireless communication apparatus and receiving from the other wireless communication apparatus radio waves responding to those transmitted radio waves, a quality analyzer for analyzing communication quality indicating the condition of the link from the received radio waves, and a quality updater for updating the analyzed communication quality on the basis of time elapsed from when the radio waves were received. In addition, the frequency selector selects the optimum frequency on the basis of the updated communication quality.

6 Claims, 8 Drawing Sheets

| CHANNEL(Ch) | RECEPTION TIME | (PRE-UPDATE) COMMUNICATION QUALITY | CURRENT TIME | POST-UPDATE COMMUNICATION QUALITY |
|---|---|---|---|---|
| 3 | Dec. 1, 12:00 | 50 | Dec. 2, 9:00 | 30 |
| 4 | Dec. 1, 9:00 | 100 | Dec. 2, 9:00 | 60 |
| 8 | Dec. 1, 15:00 | 80 | Dec. 2, 9:00 | 70 |

WIRELESS COMMUNICATION APPARATUS AND WIRELESS COMMUNICATION METHOD

CROSS-REFERENCE TO RELATED APPLICATION

This application claims the benefit of Japanese Patent Application No. 2010-275106, filed on Dec. 9, 2010, the entire disclosure of which is incorporated by reference herein.

FIELD

This application relates to a wireless communication apparatus and a wireless communication method.

BACKGROUND

In frequency bands with low communication quality (communication line quality), such as the short-wave band, it is very important to communicate at the optimum frequency. For example, in the disclosure of Unexamined Japanese Patent Application KOKAI Publication No. H4-313926 discloses a technology which chooses (selects) a frequency with high communication quality by successively observing the radio wave condition of usable frequencies and, when observation results indicating the radio wave condition of that frequency falls below a prescribed level, automatically selects another frequency.

However, short-wave band communications primarily use ionosphere reflection, but the condition of the ionosphere changes moment by moment depending on the time, region, season, number of sunspots and so forth, so the optimum frequency for communications is constantly changing. With the composition disclosed in Patent Literature 1, another frequency is automatically selected when observation results showing radio wave conditions drop below a prescribed level, so when the frequency during a call is not the optimum frequency, there are times when the call becomes difficult due to frequent switching of the frequency. For this reason, a new method is needed for selecting the optimum frequency even when the radio wave condition has changed.

In consideration of the foregoing, it is an object of the present invention to provide a suitable wireless communication apparatus and wireless communication method for selecting the optimum frequency even when the radio wave condition has changed.

SUMMARY

In order to achieve the above object, a wireless communication apparatus according to a first aspect of the present invention comprises:

a transceiver for transmitting radio waves to another wireless communication apparatus and receiving from the other wireless communication apparatus radio waves as a response to the transmitted radio waves;

a quality analyzer for analyzing communication quality indicating the condition of the link to the other wireless communication apparatus from the received radio waves;

a quality updater for updating the analyzed communication quality on the basis of time elapsed from a point in time when the radio waves were received; and a frequency selector for selecting an optimum frequency on the basis of the updated communication quality.

The quality updater may arrange the communication quality in order of highest quality, and the frequency selector may select frequencies in order of the arranged communication quality.

The other wireless communication apparatus and the wireless communication apparatus itself may share the communications quality.

The transceiver may have a sounding function.

The wireless communication method according to a second aspect of the present invention includes:

a transceiver procedure for transmitting radio waves to another wireless communication apparatus and receiving from the other wireless communication apparatus radio waves as a response to the transmitted radio waves;

a quality analyzer procedure for analyzing communication quality indicating the condition of the link to the other wireless communication apparatus from the received radio waves;

a quality updater procedure for updating the analyzed communication quality on the basis of time elapsed from a point in time when the radio waves were received; and a frequency selection procedure for selecting an optimum frequency on the basis of the updated communication quality.

With the present invention, it is possible to select the optimum frequency even when the radio wave condition has changed.

BRIEF DESCRIPTION OF THE DRAWINGS

A more complete understanding of this application can be obtained when the following detailed description is considered in conjunction with the following drawings, in which.

DETAILED DESCRIPTION

An embodiment of the present invention is described below. The embodiment described below is for explanation purposes and is not intended to limit the scope of the present invention. Accordingly, one skilled in the art could adopt embodiments in which various elements or all elements of this have been substituted with others equivalent thereto, but such embodiments also fall within the scope of the present invention.

The wireless communication apparatus according to this embodiment of the present invention is an apparatus that selects a channel (frequency) with high communication quality from among multiple channels, and establishes a link (accomplishes communications) with another wireless communication apparatus via that channel. In the explanation below, a symbol $1a$ is used for a local wireless communication apparatus and a symbol $1b$ is used for the other wireless communication apparatus with which the local wireless communication apparatus $1a$ accomplishes communications. The local wireless communication apparatus 1a and the other wireless communication apparatus 1b both have the same functions, and wireless communication is accomplished between the local wireless communication apparatus 1a and the other wireless communication apparatus 1b.

When no distinction is made between the local wireless communication apparatus 1a and the other wireless communication apparatus 1b, the explanation refers to a wireless communication apparatus 1.

In addition, the other wireless communication apparatus 1b that accomplishes communications with the local wireless communication apparatus 1a may be multiple apparatuses, but the explanation below uses a single device as the other wireless communication apparatus 1b for ease of explanation.

Figure 1:
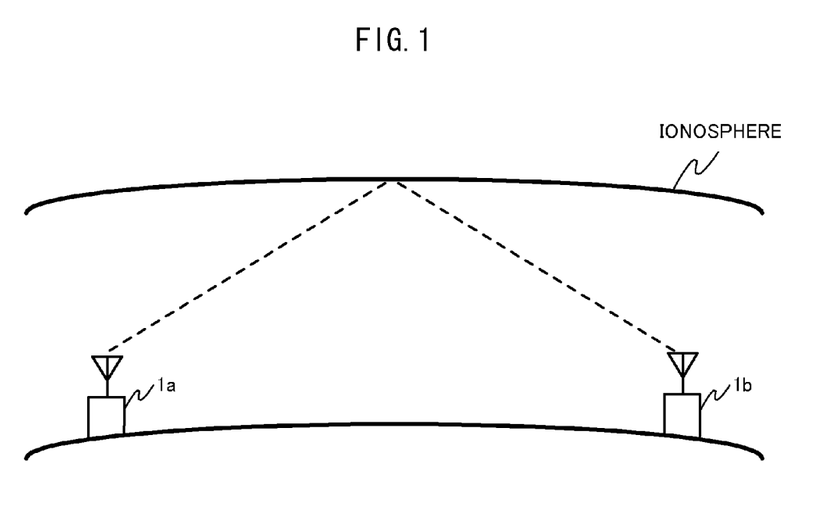
FIG. 1 shows an example of communication between wireless communication apparatuses.

Communication between the local wireless communication apparatus 1a and the other wireless communication apparatus 1b is accomplished by use of a radio wave frequency reflected by the ionosphere, as shown in FIG. 1. The condition of the ionosphere changes from moment to moment depending on the time, the geographic region, the season, the number of sunspots and the like, so the optimum frequency for accomplishing communications between the local wireless communication apparatus 1a and the other wireless communication apparatus 1b is constantly changing. Consequently, even when the condition of the ionosphere has changed, it is necessary to select (choose) the optimum frequency.

Figure 2:
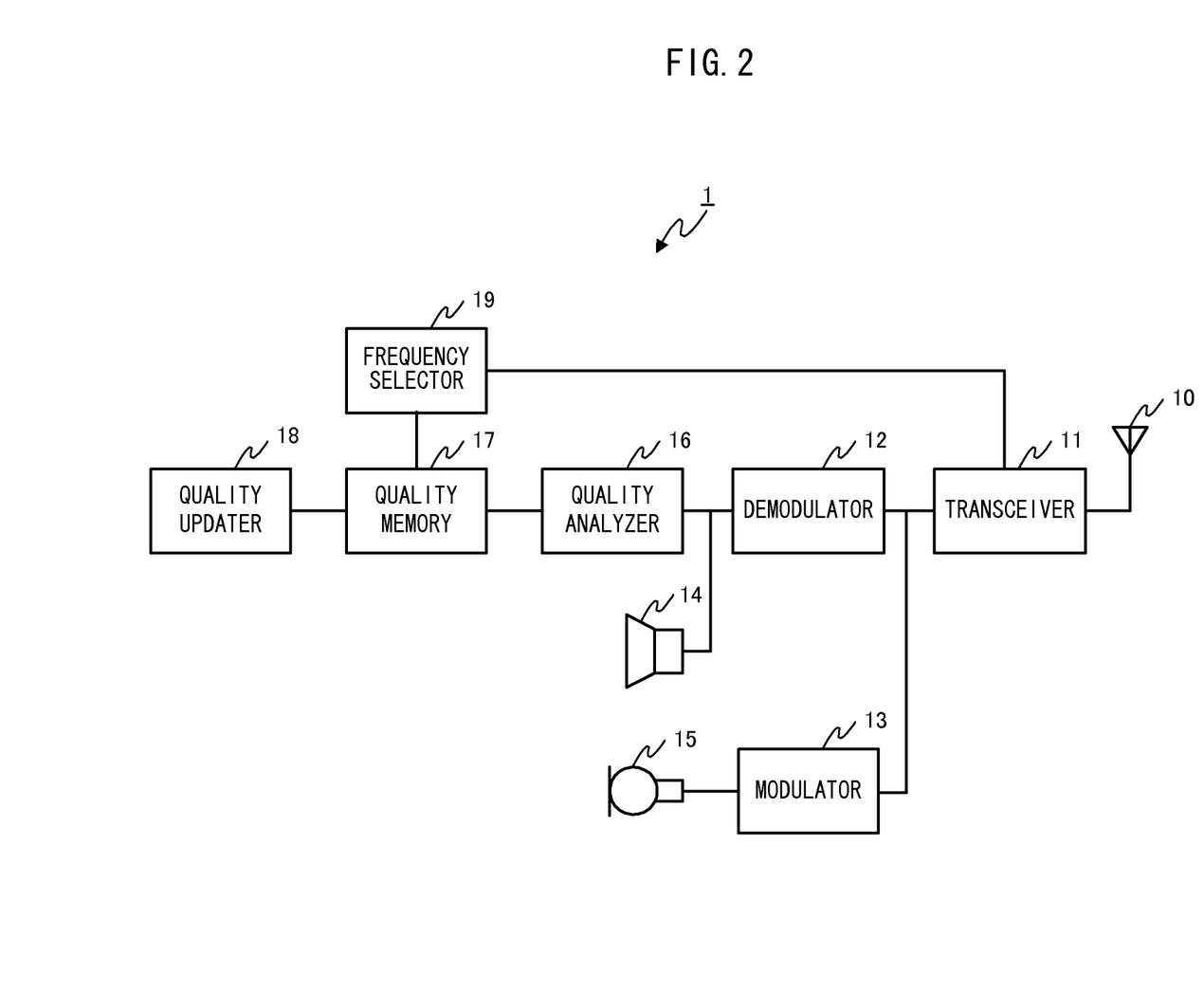
FIG. 2 is a block diagram showing the composition of a wireless communication apparatus according to an embodiment of the present invention.

The wireless communication apparatus 1 (1a, 1b) according to this embodiment of the present invention includes an antenna 10, a transceiver 11, a demodulator 12, a modulator 13, a speaker 14, a microphone 15, a quality analyzer 16, a quality memory 17, a quality updater 18 and a frequency selector 19, as shown in FIG. 2.

The antenna 10 is for receiving high-frequency signals that have undergone analog or digital modulation. In addition, the antenna 10 outputs as radio wave analog or digital modulated signals supplied from the transceiver 11. When radio wave signals transmitted by the other wireless communication apparatus 1b are received, the antenna 10 outputs those radio wave signals to the transceiver 11. In addition, when the transceiver 11 outputs radio wave signals, the antenna 10 transmits those radio wave signals to the other wireless communication apparatus 1b. Wireless communication between the local wireless communication apparatus 1a and the other wireless communication apparatus 1b is accomplished via the antenna 10.

The transceiver 11 includes for example various types of signal processing circuits and the like, such as an amp, a tuner and a filter, and accomplishes transmitting and receiving of signals via the antenna 10.

The transceiver 11 outputs to the antenna 10 transmission signals output from the modulator 13, and outputs to the demodulator 12 received signals input from the antenna 10. With the transceiver 11, the carrier frequency that is the transmission frequency is altered and wireless signals transmitted in an operating frequency band set in advance on the basis of design specifications of the wireless communication apparatus 1, for example.

In addition, the transceiver 11 is provided with a sounding function, and transmits and receives information necessary for analyzing communication quality. Here, the sounding function refers to a function for transmitting the sender's information to the recipient from the sender. Through this sounding function, it is possible to share communication quality between the sender and the recipient.

The demodulator 12 is used to demodulate signals input from the transceiver 11. When the signal input from the transceiver is an voice signal, the demodulator 12 demodulates that voice signal into an audio frequency signal. Furthermore, the demodulator 12 inputs the demodulated audio frequency signal to the speaker 14 to output sound from the speaker 14 based on the input signal.

The modulator 13 is used to modulate signals input from the microphone 15. When a signal input from the microphone 15 is an voice signal, the modulator 13 modulates that voice signal into an analog or digital high-frequency signal. Furthermore, the modulator 13 inputs that modulated signal into the transceiver 11 to transmit the modulated signal to the other wireless communication apparatus 1b via the antenna 10.

The speaker 14 converts analog signals or digital signals output from the demodulator 12 into voice signals and outputs such.

The microphone 15 receives voice signal input and converts that voice signal into an analog signal or a digital signal. The microphone 15 supplies the converted voice signal to the modulator 13.

The quality analyzer 16 includes a CPU (Central Processing Unit) or the like and analyzes the communication quality of radio wave signals received by the wireless communication apparatus 1. Here, communication quality is an index for example expressed by the strength of the received signal, the error ratio of the received signal or the time until the signal is received. The quality analyzer 16 analyzes the noise and distortion in the signal on the basis of the strength and error rate or the like of the signal output by the demodulator 12, and determines that a signal with little noise or distortion has high communication quality.

The quality memory 17 is comprised of a memory device such as an HDD (Hard Disk Drive) or semiconductor memory such as RAM, ROM, flash memory or the like, and stores the communication quality of the signal. In addition, the quality memory 17 stores the communication quality updated by the quality updater 18.

The quality memory 17 stores an operation program executed by the CPU and also data necessary for execution of various processes along with data generated by execution of various processes. The CPU executes various processes on the basis of prescribed operation programs stored on the quality memory 17.

The quality updater 18 is comprised for example of a CPU, and, when a radio wave signal transmitted by the other wireless communication apparatus 1b is received, updates the communication quality on the basis of the elapsed time from the point in time when that radio wave signal was received. The method of updating communications quality is described below.

The frequency selector 19 is comprised for example of a CPU and selects the optimum frequency for accomplishing communication with the other wireless communication apparatus 1b. Because the frequency at which communication with high communication quality is possible changes with changes in the environment, the frequency selector 19 selects the optimum frequency at the communicating time (link established time). Specifically, the frequency selector 19 selects the frequency at which communication quality stored on the quality memory 17 is optimum. When the optimum frequency is selected by the frequency selector 19, the transceiver 11 accomplishes communication with the other wireless communication apparatus 1b on the basis of the frequency selected by the frequency selector 19.

Figure 3:
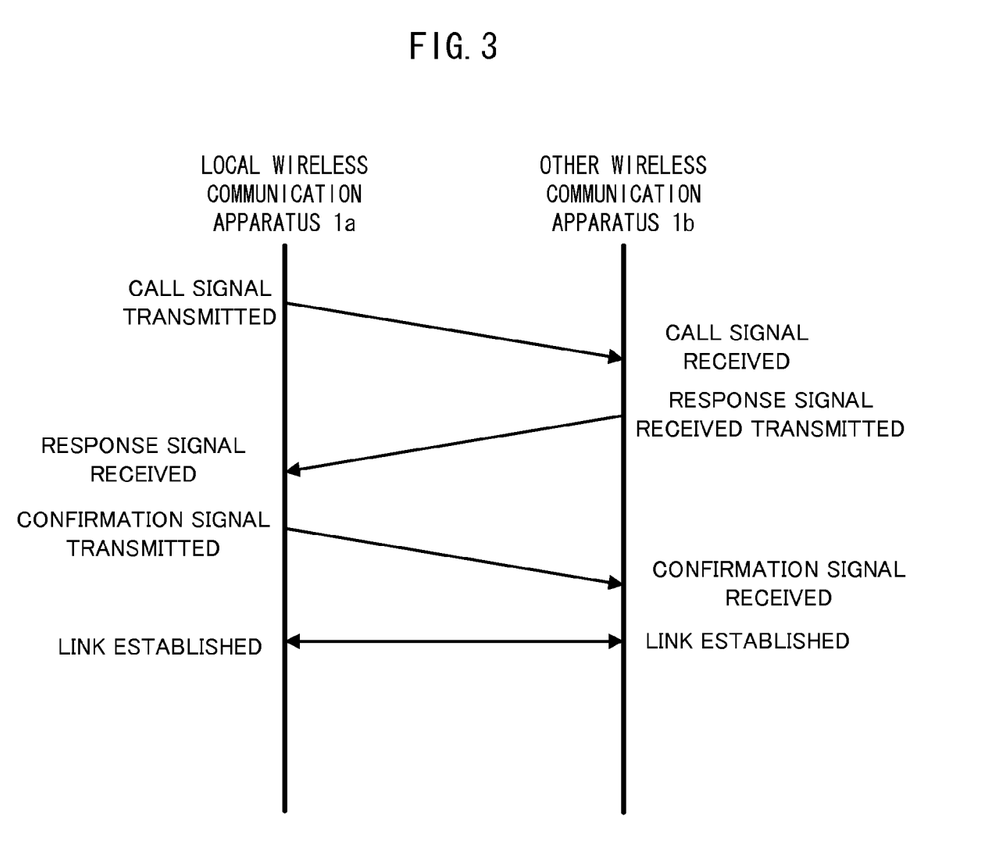
FIG. 3 is a diagram for explaining the link-establishing protocol between wireless communication apparatuses.

Next, the process of establishing the link between wireless communication apparatuses (between the local wireless communication apparatus 1a and the other wireless communication apparatus 1b) is described with reference to the drawings.

First, the local wireless communication apparatus 1a sends (transmits) a call signal calling the other wireless communication apparatus 1b, as shown in FIG. 3. The local wireless communication apparatus 1a transmits a signal output by the transceiver 11 via the antenna 10.

Next, the other wireless communication apparatus 1b receives the call signal transmitted from the local wireless communication apparatus 1a via the antenna 10.

Next, when the call signal is received, the other wireless communication apparatus 1b transmits to the local wireless communication apparatus 1a a response signal indicating that the call signal was received.

Next, the local wireless communication apparatus 1a, upon receiving the response signal transmitted by the other wireless communication apparatus 1b, transmits to the other wireless communication apparatus 1b a confirmation signal indicating that the response signal was received.

Furthermore, after the other wireless communication apparatus 1b has received the confirmation signal transmitted from the local wireless communication apparatus 1a, a link is established between the local wireless communication apparatus 1a and the other wireless communication apparatus 1b and communication is accomplished.

Figure 4:
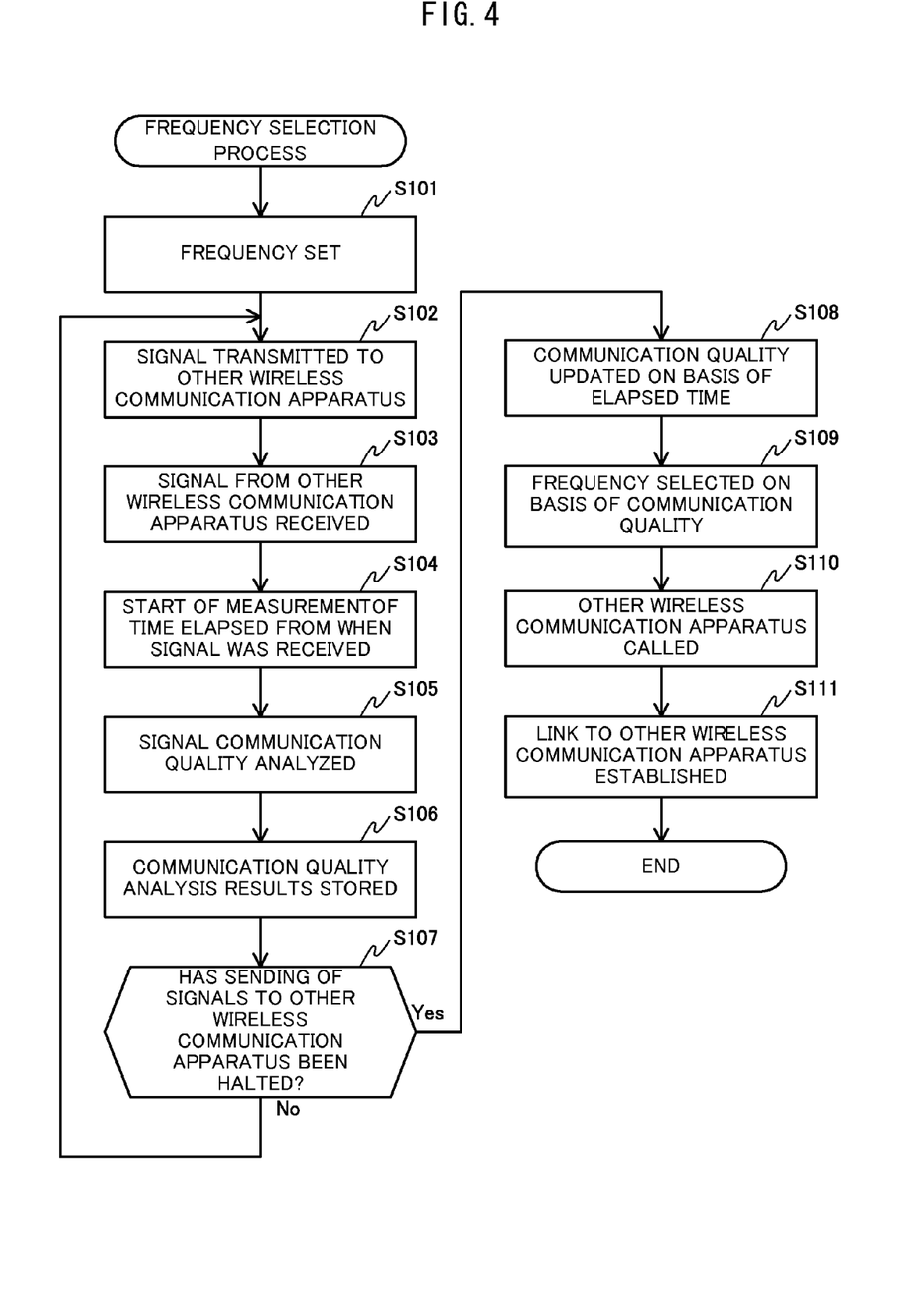
FIG. 4 is a flowchart showing the frequency selection process implemented in the wireless communication apparatus.

Next, the frequency selection process implemented by the local wireless communication apparatus 1a is explained with reference to FIG. 4.

The local wireless communication apparatus 1a starts this process upon receiving an operation from the user instructing to accomplish communication with the other wireless communication apparatus 1b, and in addition when a predetermined time is reached.

Figure 5:
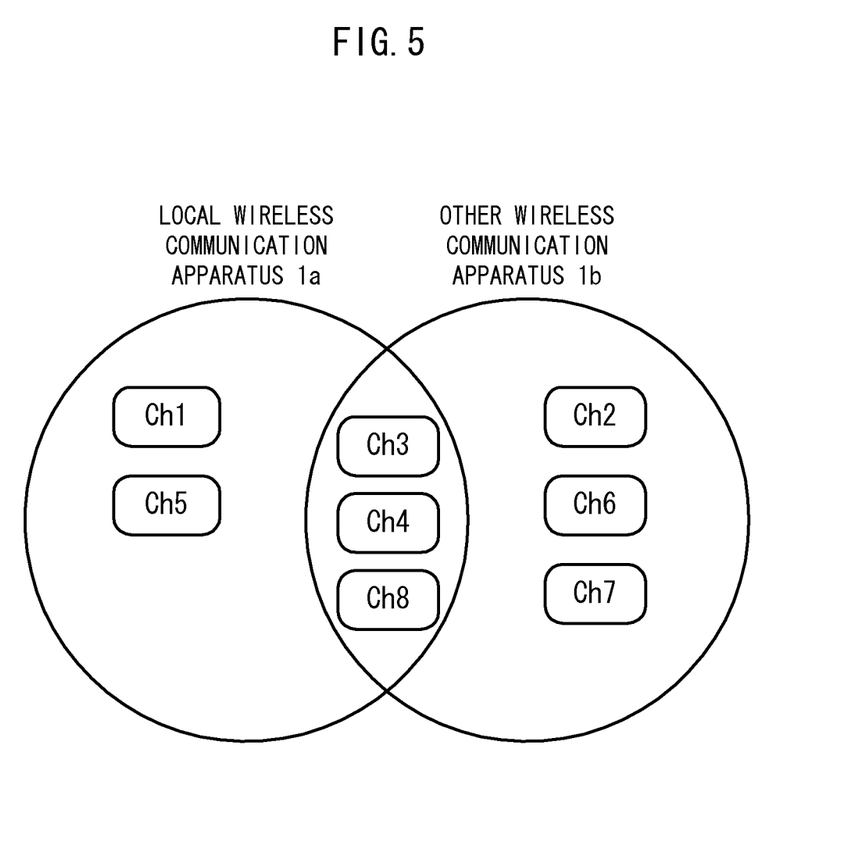
FIG. 5 is a drawing for explaining the channel composition shared between wireless communication apparatuses.

First, the local wireless communication apparatus 1a, upon receiving instructions from the user for example, sets the frequency (channel; here, communication paths with differing frequencies are termed channels) for accomplishing wireless communication with the other wireless communication apparatus 1b (step S101). As shown in FIG. 5, as frequencies for accomplishing wireless communications, channel 1 (Ch1), channel 3 (Ch3), channel 4 (Ch4), channel 5 (Ch5) and channel 8 (Ch8) are set in the local wireless communication apparatus 1a, and channel 2 (Ch2), channel 3 (Ch3), channel 4 (Ch4), channel 6 (Ch6), channel 7 (Ch7) and channel 8 (Ch8) are set in the other wireless communication apparatus 1b. There are channels mutually shared between the local wireless communication apparatus 1a and the other wireless communication apparatus 1b, so any of the shared channels is selected and wireless communications is accomplished between the local wireless communication apparatus 1a and the other wireless communication apparatus 1b. Here, the three channels Ch3, Ch4 and Ch8 are channels shared by the local wireless communication apparatus 1a and the other wireless communication apparatus 1b. Consequently, the local wireless communication apparatus 1a selects any of the channels Ch3, Ch4 and Ch8 shared with the other wireless communication apparatus 1b out of the set channels Ch1, Ch3, Ch4, Ch5 and Ch8, and accomplishes wireless communication.

Next, the transceiver 11 at prescribed time intervals and upon receiving instructions from the user transmits to the other wireless communication apparatus 1b a radio wave signal at a frequency (channel) shared with the other wireless communication apparatus 1b (step S102). The transceiver 11 transmits to the other wireless communication apparatus 1b a signal appended to which is the channel ID (Identification), the ID of the local wireless communication apparatus 1a and information about the local wireless communication apparatus 1a such as the transmission time. Furthermore, this information from the local wireless communication apparatus 1a is used to measure communication quality.

Next, the transceiver 11 receives a radio wave signal transmitted from the other wireless communication apparatus 1b (step S103). When a signal is transmitted from the local wireless communication apparatus 1a to the other wireless communication apparatus 1b in step S102, the other wireless communication apparatus 1b receives the transmitted signal and transmits a radio wave signal responding to the received signal. Furthermore, the transceiver 11 of the local wireless communication apparatus 1a receives the radio wave signal transmitted from the other wireless communication apparatus 1b. The other wireless communication apparatus 1b measures (analyzes) the signal voltage, noise voltage and distortion voltage shown by the signal transmitted from the local wireless communication apparatus 1a to the other wireless communication apparatus 1b. Furthermore, the other wireless communication apparatus 1b transmits to the local wireless communication apparatus 1a a signal to which is appended those measurements result, the time the signal was received, the channel ID and information about the other wireless communication apparatus 1b such as the ID of the other wireless communication apparatus 1b. Furthermore, this information about the wireless communication apparatus 1b is used for measuring communication quality. By accomplishing this exchange with a signal being transmitted from the local wireless communication apparatus 1a to the other wireless communication apparatus 1b and a signal being transmitted from the other wireless communication apparatus 1b to the local wireless communication apparatus 1a, it is possible to share communication quality between the local wireless communication apparatus 1a and the other wireless communication apparatus 1b.

Next, the transceiver 11 starts counting from the time the signal transmitted from the other wireless communication apparatus 1b was received and begins measuring the time elapsed from the time the signal was received (step S104). The transceiver 11 measures the time elapsed using for example an RTC (Real Time Clock) or a timer.

Next, the quality analyzer 16 analyzes the communication quality of the signal for each channel shared by the local wireless communication apparatus 1a and the other wireless communication apparatus 1b on the basis of the information about the local wireless communication apparatus 1a and the information about the other wireless communication apparatus 1b (step S105). As parameters for measuring the communication quality, SINAD (Signal to Noise and Distortion), time until the radio waves are received, reception channel, sender ID and the like can be considered, for example. The quality analyzer 16 analyzes the communication quality on the basis of these parameters. When analyzing communication quality through SINAD, the quality analyzer 16 analyzes the communication quality of the signal by introducing into the below equation (1) the signal voltage (S), the noise voltage (N) and the distortion voltage (D) indicated by the signal received in step S103.

$$SINAD = (S+N+D)/(N+D) \tag{1}$$

Figure 6:
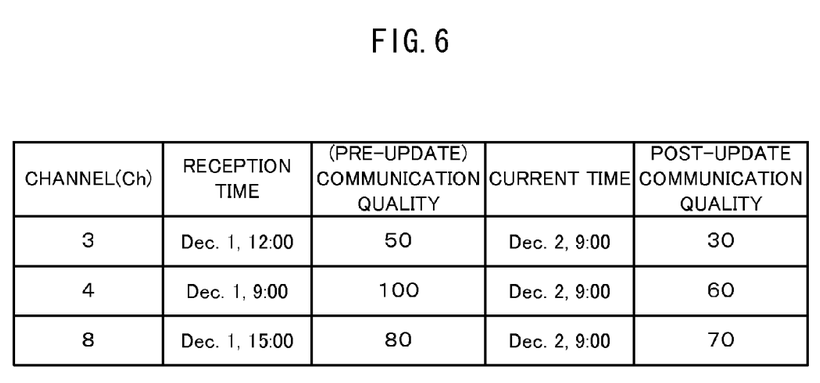
FIG. 6 shows an example of communication quality analysis results.

Next, the quality memory 17 stores the communication quality analyzed by the quality analyzer 16 (step S106). As shown in FIG. 6, the quality memory 17 stores the communication quality of the signal for each channel. Here, the channels shared by the local wireless communication apparatus 1a and the other wireless communication apparatus 1b are Ch3, Ch4 and Ch8, so the quality memory 17 stores communication quality for signals in these three channels.

Next, the transceiver 11 determines whether or not to halt the transmission of signals to the other wireless communication apparatus 1b (step S107).

When the transmission of signals is not halted (step S107; No), the transceiver 11 transmits a signal to the other wireless communication apparatus 1b (step S102).

The process in steps S102 to S107 is a so-called sounding function, and with it communication quality is measured between the local wireless communication apparatus 1a, which is the sender, and the other wireless communication apparatus 1b, which is the recipient. In the sounding function there are cases of automatically transmitting information to the recipient from the sender at set time intervals (for example, 30 minutes, 45 minutes, 1 hour, 2 hours, 3 hours, 4 hours, 8 hours, 16 hours and so forth) and cases of manually transmitting information in accordance with requests from the user. Consequently, in step S107 the case when the transmitting of signals to the other wireless communication apparatus 1b is not halted (step S107; No) typically is a case in which a sounding function transmitting information automatically is effective or a case in which there is a request from the user to continue the sounding function. In these cases, the transceiver 11 determines not to halt the transmitting of signals.

On the other hand, when the transmitting of signals is halted (step S107: Yes), the quality updater 18 updates the communication quality of signals in each channel on the basis of the time elapsed from the time the signal transmitted from the other wireless communication apparatus 1b was received (step S108). Furthermore, the quality updater 18 stores the updated communication quality in the quality memory 17. Consequently, the quality memory 17 stores the communication quality prior to updating and the communication quality after updating.

Figure 7:
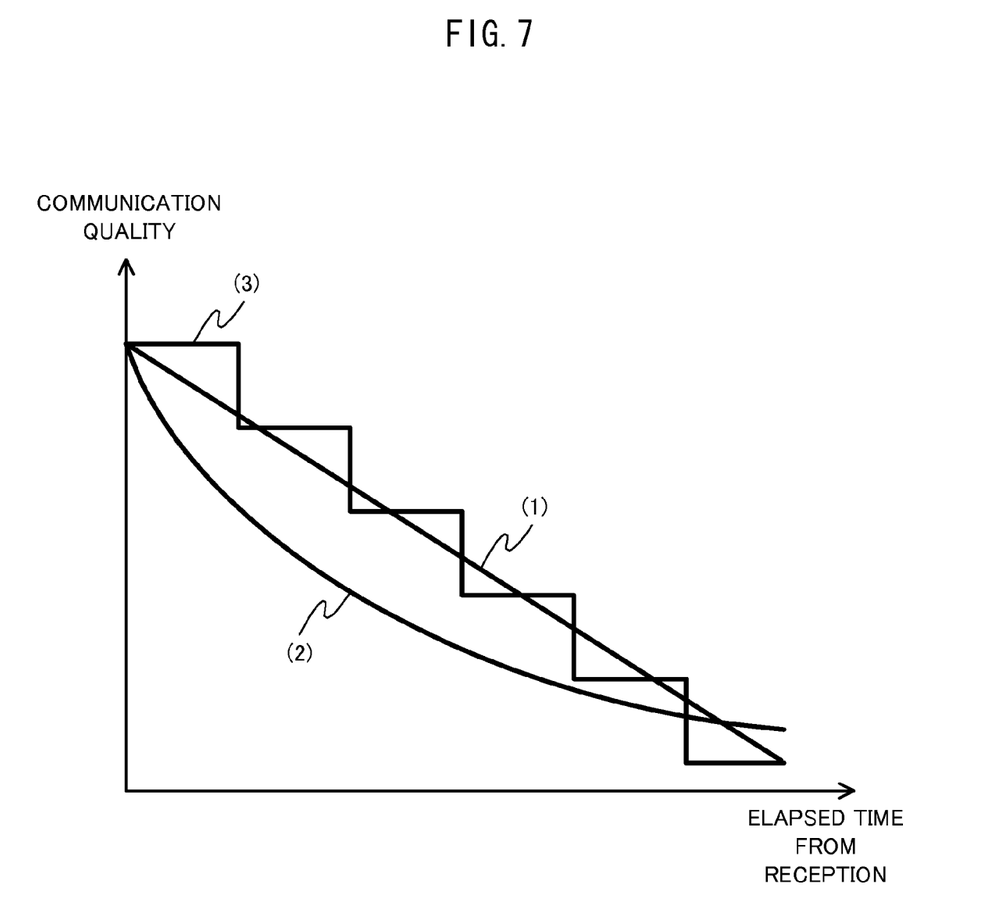
FIG. 7 shows an example of updating communication quality.

The quality updater 18 updates communication quality on the basis of a predetermined relationship between elapsed time and communication quality. The quality updater 18 updates communication quality for example on the basis of a graph (computation formula) showing how communication quality degrades as elapsed time increases, as shown in FIG. 7. This is because the optimum frequency for establishing a link (communicating) with the other wireless communication apparatus 1b differs between the time when the communication quality was analyzed and the time when communication was actually started because the radio wave condition changes due to changes in the ionosphere from moment to moment as a result of the effects of time and the like. Consequently, it is possible to select the optimum frequency conforming with conditions changing moment by moment without frequently exchanging signals between the local wireless communication apparatus 1a and the other wireless communication apparatus 1b by causing the communication quality to degrade (decrease) on the basis of the elapsed time from the time when the communication quality was analyzed.

Next, the frequency selector 19 selects a frequency (channel) for accomplishing wireless communication with the other wireless communication apparatus 1b on the basis of communication quality updated by the quality updater 18 and stored in the quality memory 17 (step S109). As shown in FIG. 6, the order of highest communication quality (prior to updating) is Ch4>Ch8>Ch3, and the order of highest communication quality after updating is Ch8>Ch4>Ch3. Consequently, the frequency selector 19 selects the frequency (channel) as Ch8→Ch4→Ch3 in order of highest communication quality after updating.

Next, the transceiver 11 calls the other wireless communication apparatus 1b in the channel order selected by the frequency selector 19 (step S110). Here, the channel order is selected as Ch8→Ch4→Ch3, so the transceiver 11 first calls the other wireless communication apparatus 1b on Ch8, then calls the other wireless communication apparatus 1b in the order Ch4 and then Ch3.

Furthermore, the transceiver 11 after calling the other wireless communication apparatus 1b in the channel order selected by the frequency selector 19 establishes a link with the other wireless communication apparatus 1b on the channel in which there was a response from the other wireless communication apparatus 1b (step S111). For example, when there was a response from the other wireless communication apparatus 1b on Ch8 which was initially called, the transceiver 11 establishes a link with the other wireless communication apparatus 1b on Ch8. However, where there is no response from the other wireless communication apparatus 1b on Ch8, but there is a response from the other wireless communication apparatus 1b on Ch4, the transceiver 11 establishes a link with the other wireless communication apparatus 1b on Ch4. Through this, it is possible to select the optimum frequency (channel) because a link between the local wireless communication apparatus 1a and the other wireless communication apparatus 1b is established in the order of channels having the highest communication quality.

Through the above process, it is possible to select the optimum frequency even when radio wave conditions have changed because the ionosphere changes moment by moment due to the effects of time, geographical region, season, the number of sunspots and so forth.

The present invention is not limited to the above-described embodiment, for various variations and applications are also possible.

The wireless communication apparatus 1 can also accomplish wireless communications in an arbitrary frequency band other than the short-wave band.

The quality analyzer 16 can also analyze the communication quality using an arbitrary method and arbitrary parameters.

The quality updater 18 can also update the communication quality using a graph (computation formula) that differs for each channel. For example, the quality updater 18 can update the communication quality of Ch3 on the basis of the graph (1) shown in FIG. 7, update the communication quality of Ch4 on the basis of a graph (2) shown in FIG. 7, and not update (not degrade) the communication quality of Ch8.

Figure 8:
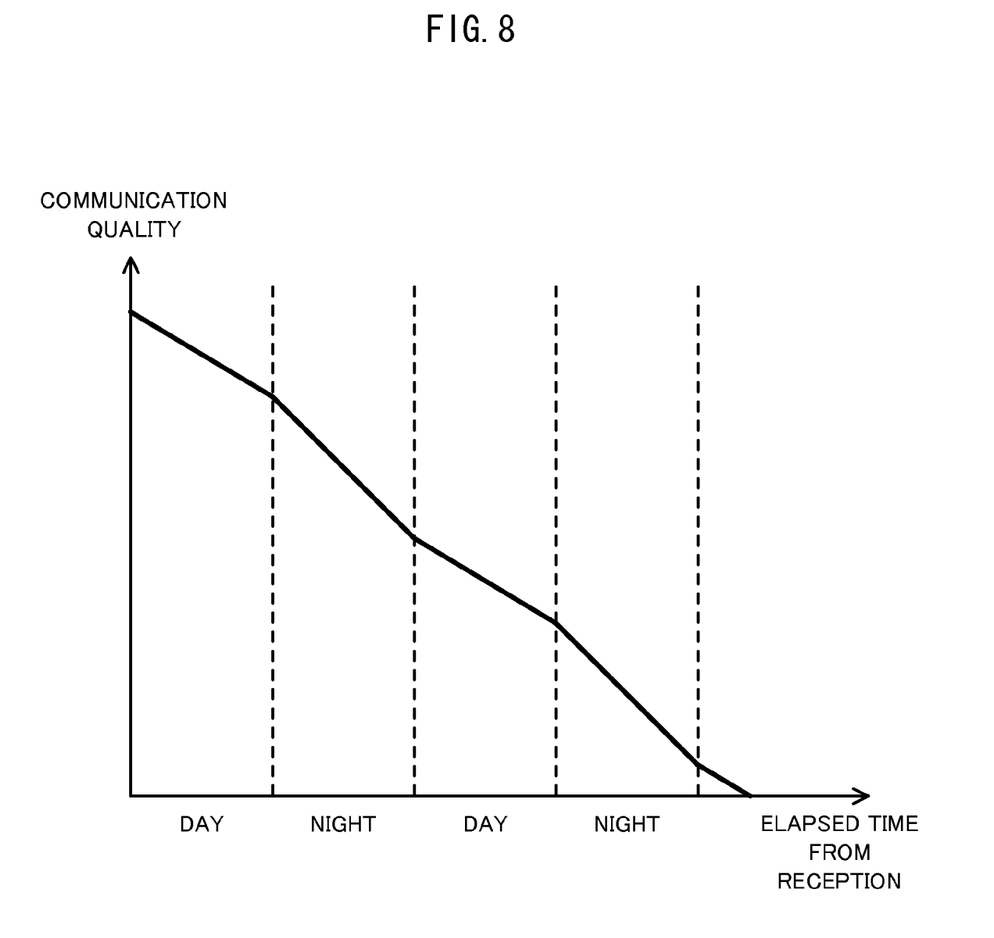
FIG. 8 shows an example of changing the communications quality update method with time slot.

In addition, the quality updater 18 can update communication quality on the basis of an arbitrarily determined relationship (graph, or computation formula) between the elapsed time and communication quality. For example, the quality updater 18 can update the degradation rate causing the communication quality to degrade through time slot, season, weather or the like. As shown in FIG. 8, the quality updater 18 can change the degradation rate of the communication quality between day and night, with the degradation rate at night being larger than the degradation rate in the day. In addition, the quality updater 18 can make the degradation rate in the summer larger (or smaller) than the degradation rate in the winter, and can change the degradation rate of the communication quality depending on whether it is sunny, cloudy or rainy. In addition, for example the relationship between communication quality and elapsed time may also be such that the communication quality is increased in accordance with elapsed time. In this case, the quality updater 18 can also change the rate of increase increasing the communication quality depending on the time slot, season, weather and the like. In addition, for example the relationship between communication quality and elapsed time may also include areas where communication quality increases and areas where this decreases in accordance with elapsed time.

The part that is central to accomplishing the processes of a wireless communication apparatus 1 includes the antenna 10, the transceiver 11, the demodulator 12, the modulator 13, the speaker 14, the microphone 15, the quality analyzer 16, the quality memory 17, the quality updater 18 and the frequency selector 19 can be realized using a typical computer system rather than a specialized system. For example, the wireless communication apparatus 1 for executing the above-described processes may be composed by storing and distributing a computer program for executing the above-described operations on a computer-readable medium (flexible disk, CD-ROM, DVD-ROM or the like) and installing that computer program on a computer. In addition, the wireless communication apparatus 1 may be comprised by storing that computer program on a storage apparatus possessed by a server apparatus on a communication network such as the Internet and having such downloaded by a normal computer system.

In addition, when the functions of the wireless communication apparatus 1 are realized by allocating such between an OS (operating system) and application program or having the OS and application programs work together, the application program part alone may be stored on a storage medium or storage apparatus.

In addition, the computer program may be overlaid on carrier waves and distributed via a communication network. For example, the computer program may be posted on a bulletin board (BBS: Bulletin Board System) on a communication network, and that computer program may be distributed via the network. Furthermore, the above-described process may be executed by launching this computer program and executing such similar to other application programs under the control of the OS.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A wireless communication apparatus comprising:
   a transceiver for transmitting radio waves to another wireless communication apparatus and receiving from said another wireless communication apparatus radio waves as a response to said transmitted radio waves;
   a quality analyzer for analyzing communication quality indicating a condition of a link to said another wireless communication apparatus from said received radio waves;
   a quality updater for retaining data indicative of a relationship of a degradation of the communication quality as a time elapsed from a point in time when said radio waves are being received by said transceiver increases, the quality updater operable to update said analyzed communication quality on a basis of the data and the elapsed time, wherein said quality updater retains data indicative of a relationship between the time elapsed from the point in time when said radio waves are being received by said transceiver and said communication quality that degrades by a degradation rate according to a time slot; and
   a frequency selector for selecting an optimum frequency on a basis of said updated analyzed communication quality.

2. The wireless communication apparatus according to claim 1, wherein said quality updater arranges said communication quality in order of highest quality, and
   said frequency selector selects frequencies in order of said arranged communication quality.

3. The wireless communication apparatus according to claim 1, wherein said another wireless communication apparatus and the wireless communication apparatus itself share said communication quality.

4. The wireless communication apparatus according to claim 1, wherein said transceiver has a sounding function.

5. The wireless communication apparatus according to claim 1, wherein:
   when the transmission of radio waves to the another wireless communication apparatus is halted, said quality updater updates said analyzed communication quality; and
   when said communication quality is updated, said frequency selector selects the optimum frequency.

6. A wireless communication method including:
   a transceiver procedure for transmitting radio waves to another wireless communication apparatus and receiving from said another wireless communication apparatus radio waves as a response to said transmitted radio waves;
   a quality analyzer procedure for analyzing communication quality indicating a condition of a link to said another wireless communication apparatus from said received radio waves;
   a quality updater procedure for retaining data indicative of a relationship of a degradation of the communication quality as a time elapsed from a point in time when said radio waves are being received by said transceiver increases, the quality updater procedure operable to update said analyzed communication quality on a basis of the data and elapsed time, wherein said quality updater procedure retains data indicative of a relationship between the time elapsed from the point in time when said radio waves are being received by said transceiver and said communication quality that degrades by a degradation rate according to a time slot; and
   a frequency selection procedure for selecting an optimum frequency on a basis of said updated analyzed communication quality.

* * * * *